United States Patent
Jayathirtha et al.

(10) Patent No.: US 10,460,614 B2
(45) Date of Patent: Oct. 29, 2019

(54) METHODS SYSTEM FOR REAL-TIME ASSESSMENT AND ASSISTANCE OF REDUCED ENGINE TAXI OPERATIONS FOR AN AIRCRAFT

(71) Applicant: HONEYWELL INTERNATIONAL INC., Morris Plains, NJ (US)

(72) Inventors: Srihari Jayathirtha, Bangalore (IN); Kalimulla Khan, Bangalore (IN); Raghu Shamasundar, Bangalore (IN); Mahesh Sivaratri, Bangalore (IN); Chavdar Kirov, Sofia (BG); Dragomir Kamov, Brno (CZ); Karol Molnar, Brno (CZ); Stanislav Foltan, Brno (CZ); Karel Mundel, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/868,383

(22) Filed: Jan. 11, 2018

(65) Prior Publication Data
US 2019/0213897 A1    Jul. 11, 2019

(51) Int. Cl.
*G08G 5/06* (2006.01)
*G06Q 10/06* (2012.01)
(Continued)

(52) U.S. Cl.
CPC ............. *G08G 5/065* (2013.01); *B64D 45/00* (2013.01); *G06Q 10/067* (2013.01); *G06Q 10/20* (2013.01)

(58) Field of Classification Search
CPC ...... G08G 5/065; B64D 45/00; G06Q 10/067; G06Q 10/20
See application file for complete search history.

(56) References Cited

U.S. PATENT DOCUMENTS 7,818,100 B2 * 10/2010 Goodman ............ G05D 1/0083
244/111
8,676,399 B2    3/2014 Nutaro et al.
(Continued)

FOREIGN PATENT DOCUMENTS

EP    3002716 A1    4/2016

OTHER PUBLICATIONS

Ithnan et al., Aircraft Taxiing Strategy Optimization, Department Maritime & Transport Technology, Jan. 2015, Retrieved from the Internet: URL: http://rstrail.nl/new/wp-content/uploads/2015/02/izzudin_ithnan.pdf , Technology University of Delft, Netherlands.

*Primary Examiner* — Russell Frejd
(74) *Attorney, Agent, or Firm* — Lorenz & Kopf, LLP

(57) ABSTRACT

Methods and systems are provided for providing real-time assessment and analysis for reduced engine taxi operations (RETO) for an aircraft. The method includes retrieving time sensitive data, non-time sensitive data and ground operational data that all affect RETO of the aircraft. This data is collected with an RETO analyzer which applies a predetermined ruleset to determine a RETO recommendation for the aircraft. The recommendation is transmitted to a RETO support module which retrieves historical flight data and cost model and financial model data for the aircraft. The support module then generates and displays RETO alerts, implementation plans and map overlays for the aircraft.

18 Claims, 3 Drawing Sheets

(51) Int. Cl.
 *B64D 45/00* (2006.01)
 *G06Q 10/00* (2012.01)

(56) References Cited

U.S. PATENT DOCUMENTS

| | | |
|---|---|---|
| 9,105,186 B2 | 8/2015 | Gayraud et al. |
| 9,120,565 B2 * | 9/2015 | Cox ..................... B64C 25/405 |
| 9,771,148 B2 * | 9/2017 | Cox ..................... B64C 25/405 |
| 2015/0129712 A1 * | 5/2015 | Cox ..................... B64C 25/405 244/50 |
| 2016/0096620 A1 * | 4/2016 | Kracke ................. B64C 25/10 244/50 |
| 2016/0129997 A9 * | 5/2016 | Cox ..................... B64C 25/405 244/114 B |
| 2016/0343259 A1 * | 11/2016 | Ince .................... G08G 5/0043 |
| 2017/0008618 A1 * | 1/2017 | Cox ..................... B64C 25/405 |
| 2017/0267377 A1 * | 9/2017 | Rheaume ............... B64F 1/225 |

* cited by examiner

METHODS SYSTEM FOR REAL-TIME ASSESSMENT AND ASSISTANCE OF REDUCED ENGINE TAXI OPERATIONS FOR AN AIRCRAFT

TECHNICAL FIELD

The present invention generally relates to aircraft operations, and more particularly relates to providing a real-time assessment and assistance of reduced engine taxi operations for an aircraft.

BACKGROUND

Reduced engine taxi operations (RETO) for on the ground aircraft during taxi operations are increasingly being deployed by operators across the globe owing to its economical as well as environmental benefits. On an average, RETO can deliver 20 to 40 percent reduction in ground level fuel burn and $CO_2$ emissions. Additionally, this operation can significantly reduce the noise at the airports, improve the overall air quality and result in reduced aircraft maintenance costs. While RETO is generally recommended by the operators when an aircrew expects long taxi duration, the actual decision to go ahead with RETO is made on flight-by-flight basis and the conditions of the day.

Hence, there is a need for real-time assessment and assistance of RETO for an aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for providing real-time assessment and analysis for reduced engine taxi operations (RETO) for an aircraft. The method comprises: retrieving time sensitive data that affects RETO for the aircraft; retrieving non-time sensitive data that affects RETO for the aircraft; retrieving ground operational data that affects RETO for an airport used by the aircraft; collecting the time sensitive data, the non-time sensitive data and the ground operational data with an RETO analyzer which applies a predetermined RETO rules set to determine a recommendation of RETO for the aircraft; transmitting the recommendation of RETO to a RETO support module; retrieving historical flight data with the RETO support module to support RETO for the aircraft; retrieving cost model and financial model data with the RETO support module to support RETO for the aircraft; generating RETO alerts, implementation plans and map overlays for the aircraft with the RETO support module; and displaying the RETO alerts, implementation plans and map overlays to an aircrew member of the aircraft.

A system is provided for providing real-time assessment and analysis for reduced engine taxi operations (RETO) for an aircraft. The apparatus comprises: a RETO analyzer that, retrieves time sensitive data that affects RETO for the aircraft, retrieves non-time sensitive data that affects RETO for the aircraft, retrieves ground operational data that affects RETO for an airport used by the aircraft, analyzes the time sensitive data, the non-time sensitive data and the ground operational data by applying a predetermined RETO ruleset to determine a recommendation of RETO for the aircraft, and transmits the recommendation of RETO to a RETO support module; a RETO support module that receives the recommendation of RETO, where the RETO support module, retrieves historical flight data to support RETO for the aircraft, retrieves cost model and financial model data to support RETO for the aircraft, and generates RETO alerts, implementation plans and map overlays for the aircraft; transmits the RETO alerts, implementation plans and map overlays for the aircraft; and a graphical display device on board the aircraft that receives the RETO alerts, implementation plans and map overlays for the aircraft from the RETO support module, where the graphical display device displays the RETO alerts, implementation plans and map overlays to aircrew of the aircraft.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for providing real-time assessment and assistance of for reduced engine taxi operations (RETO) for aircraft taxi operations have been developed. RETO when managed efficiently can lead to significant fuel savings, operational cost, maintenance cost and reduction in $CO_2$ emissions. An aircrew that manages this operation on flight-by-flight basis with available information at their disposal from the dispatch, air traffic control (ATC) and ground handling teams.

The system is typically hosted as an application programming interface (API) on a portable electronic device (PED) such as an Electronic Flight Bag (EFB) that determines the applicability of the RETO for the flight considering current conditions and aircraft configuration. If conditions for RETO are allowable, the system provides alerts and visual cues to the crew for successful implementation of the operation. Additionally, the system can be hosted as an application program interface (API) on ground based devices to provide RETO applicability and support associated operational requirements.

For pedagogical purposes, a vehicle may be described hereinafter as an aircraft. However, it is understood that the teachings herein are applicable to other types of vehicles including without limitation ships, automobiles, buses, trains, space craft and any other vehicle. Thus, a pilot of an aircraft may be more generically referred to as an operator of a vehicle.

Figure 1:
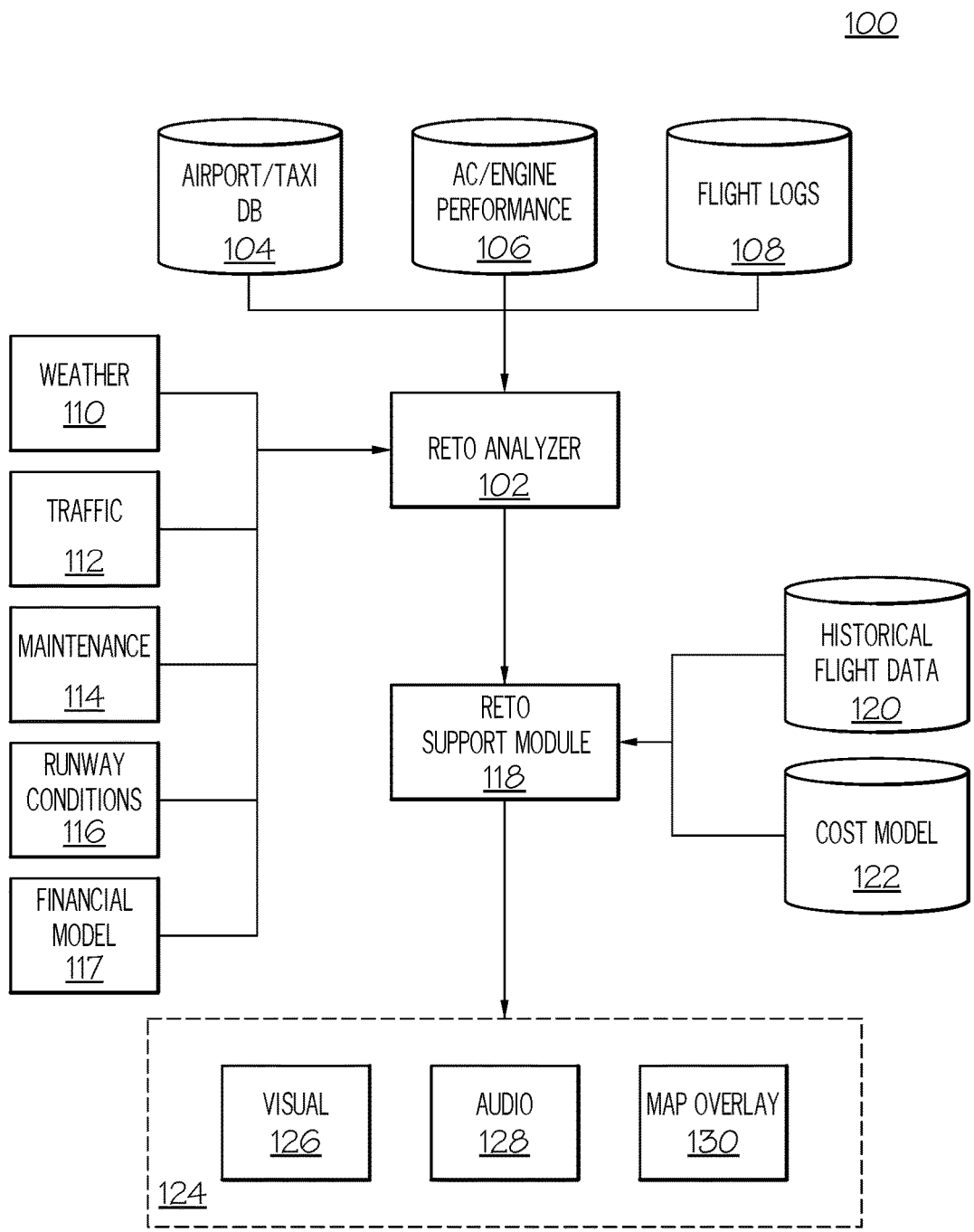
FIG. 1 shows a block diagram of a system for providing real-time assessment and assistance of RETO for an aircraft in accordance with one embodiment.

Turning now to FIG. 1, a block diagram 100 is shown of a system for providing real-time assessment and assistance of RETO for an aircraft in accordance with one embodiment. The system includes two modules: a RETO analyzer 102; and a RETO support module 118. The RETO analyzer 102 receives time sensitive data that affects RETO for the aircraft. The time sensitive data includes: real-time weather data 110; real-time traffic data 112; real-time maintenance status and condition of the aircraft 114; real-time runway and taxiway conditions 116; and a financial model of aircraft operations 117. Additionally, the RETO analyzer 102 also receives non-time sensitive data that affects RETO for the aircraft. The non-time sensitive data includes; aircraft/engine performance characteristics 106; and flight log data for the aircraft 108. Finally, the RETO analyzer 102 receives airport and taxiway layouts and information from an electronic database 104.

The RETO analyzer module 102 determines the applicability of the RETO operation by evaluating the present airport conditions against the operator standard operating procedures (SOPs). The SOP's are typically preloaded on the PED in the form of a RETO ruleset. Based on the taxiway allocated by ATC, the application determines the length of the taxiway, number and magnitude of turns, slopes, number of stops, etc. from airport databases 104. The aircraft engine performance and the aircrew's familiarity with the runway and airport are also gathered from the databases 106 and flight logs 108. This information is then referenced with real-time information like the weather 110, traffic 112, surface conditions 116 and aircraft maintenance cycles 114 to determine if all the conditions for the RETO are allowed according to SOP. For example, RETO may not be allowed due to: weather conditions; multidirectional taxiways that would require numerous turns an excessive braking usage; historical health of the engines; need to balance engine usage; time and space available to regain run up for reduced engine (based on thermal stabilization time for the engine); and other operational considerations for the aircraft. Additionally, the RETO analyzer module 102 also uses a financial model 117 that evaluates the applicability of the RETO operation based on a profitability standpoint utilizing cost model data, time sensitive and non-time sensitive information.

When RETO is recommended by the RETO analyzer 102, the RETO support module 118 provides the aircrew with alerts and step by step recommendations on the implementation of RETO. This module 118 evaluates the engine to be selected for use based on historical flight data and Aircraft system configuration 120, including: previous flight information related to the engine operating time; previous reduced engine operation during taxi; auxiliary power unit (APU) and engine performance; and the taxiway configuration (e.g., turn direction, number of braking points, etc.). Additionally, a cost model 122 is used to provide a cost based analysis of the APU operation, engine/brake maintenance and jet fuel prices to optimize the APU and engine usage.

The RETO alerts, operational plans and graphical map overlays are provided to a graphical display device 124 for access by the aircrew. This information may be visual 126 audio or aural 128 and a graphical map overlay of the taxi route 130. The RETO recommendation may cover both "taxi in" operations to an airport terminal and "taxi out" operations to an airport runway. The graphical display device 124 may be an integral part of the PED. In alternative embodiments, the PED may be an electronic flight bag (EFB). In other embodiments, the graphical display device 124 may include a capability for the air crew of the aircraft to override the recommendation of RETO by the system.

Figure 2:
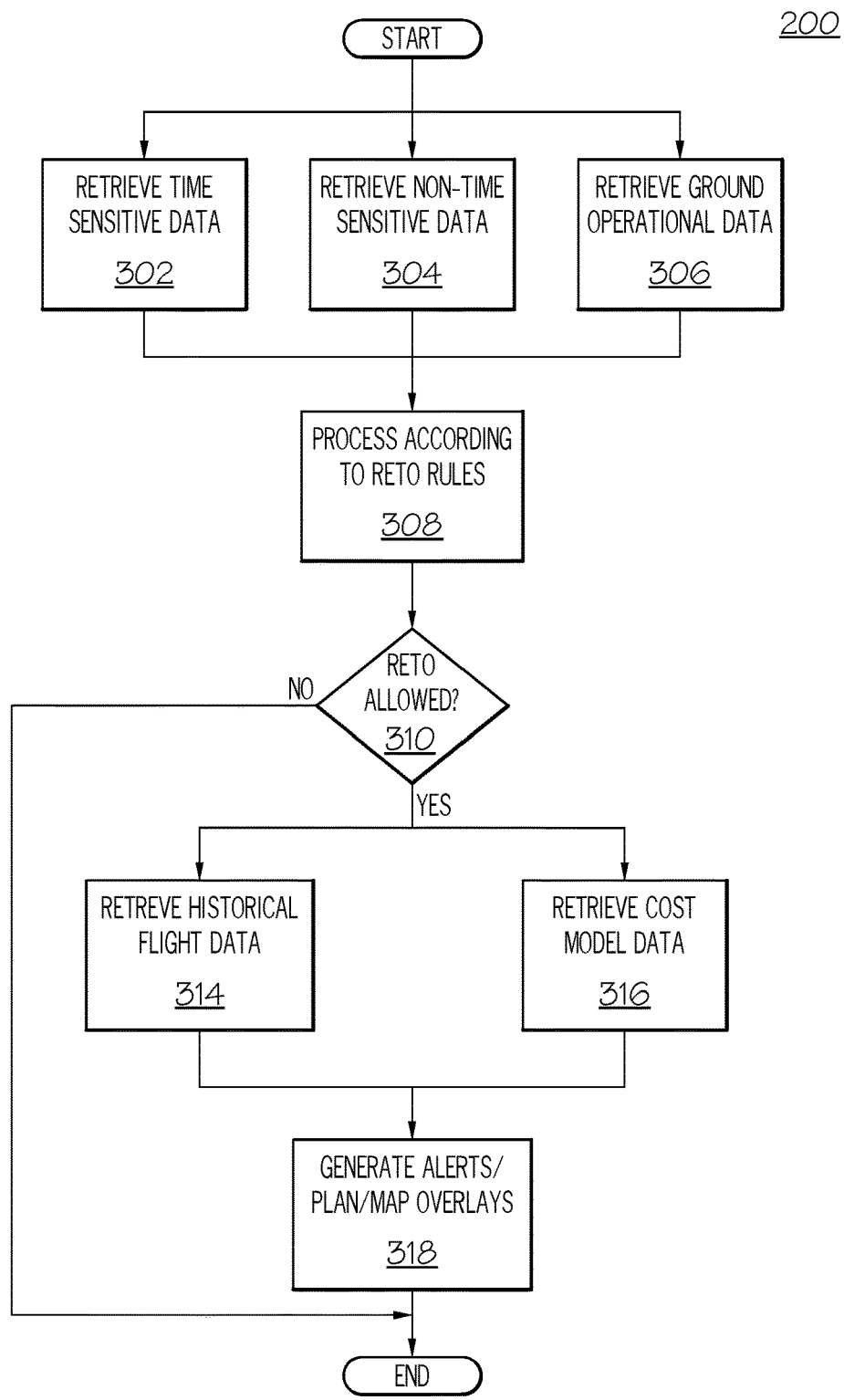
FIG. 2 shows a flowchart of a method for providing real-time assessment and assistance of RETO for an aircraft in accordance with one embodiment.

Turning now to FIG. 2, a flowchart 200 is shown of a method for providing real-time assessment and assistance of RETO for an aircraft in accordance with one embodiment. First, time sensitive data 302, non-time sensitive data 304 and ground operational data 306 are retrieved and provided to an RETO analyzer which applies a predetermined ruleset to determine a recommendation of RETO for the aircraft 308. If RETO is allowed 310, historical flight data 314 and cost model data 314 are retrieved and provided to a RETO support module. The support module generates RETO alerts, operational plans and map overlays 318 for delivery to the aircrew.

Figure 3:
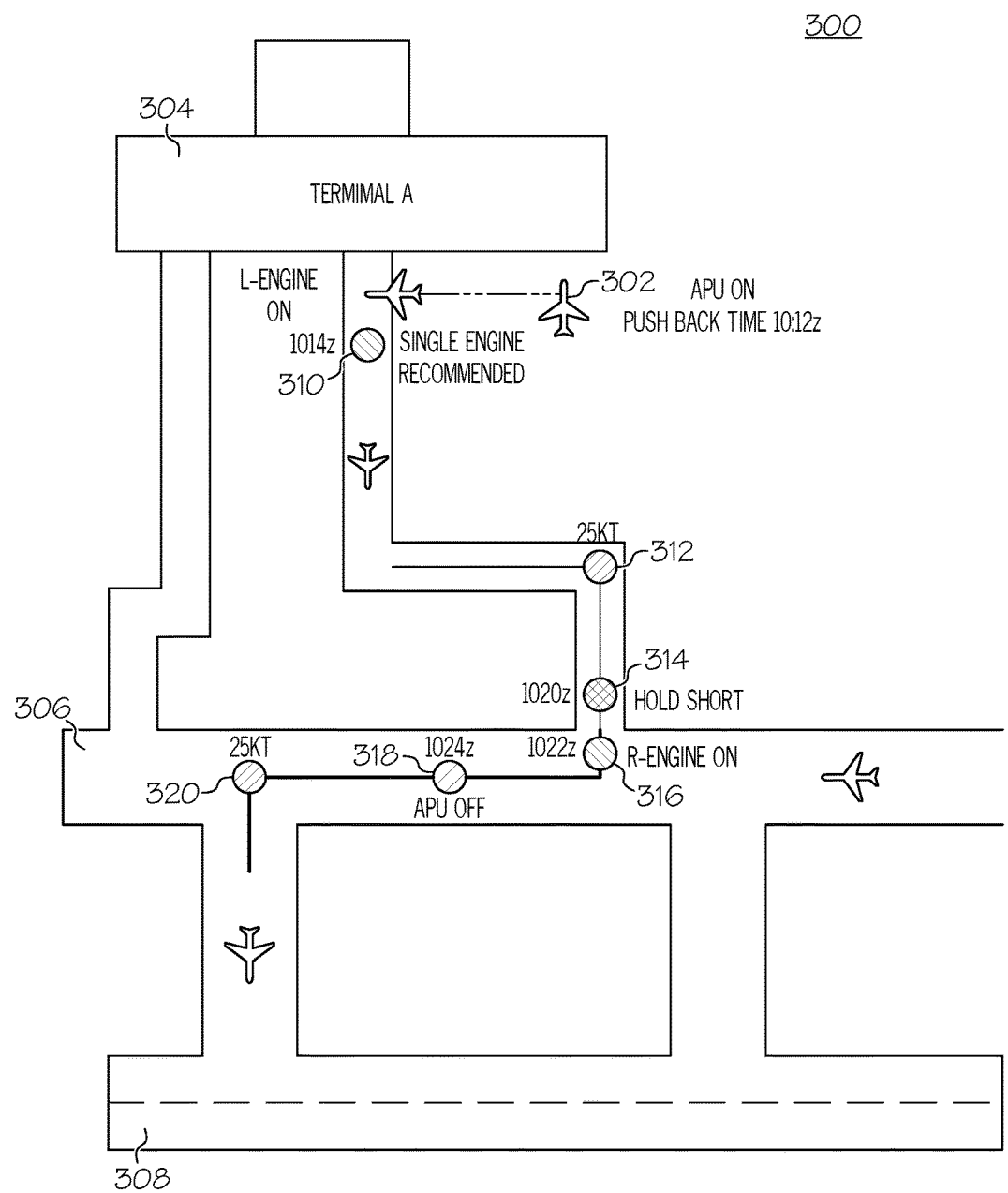
FIG. 3 shows a diagram of an example of providing real-time RETO advisories for aircraft operations in accordance with one embodiment.

Turning now to FIG. 3, a diagram 300 is shown of an example of providing real-time RETO advisories for aircraft operations in accordance with one embodiment. In this embodiment, an aircraft 302 is conducting "taxi out" operations away from the terminal 304 to the taxiway 306 and on to the runway 308 of the airport. Upon beginning taxi operations, the system recommends single-engine operations 310. The aircraft 302 begin single-engine operations while following the map overlay. The aircraft 302 maintains a ground speed of 25 kt. 312 until reaching a "hold short" position 314 prior to entering the taxiway 306. At this point, the aircraft is instructed to start its idled engine 316 and subsequently switch off its APU 318 while still maintaining a speed of 25 kt. on the taxiway 306. This allows the restarted engine adequate time to warm up 320 prior to takeoff.

As shown in FIG. 3, real-time advisories may be provided to the aircraft during the taxi-out phase for such things as: estimated pushback time; estimated takeoff time; engine selection; engine spool up time; and optimum APU usage. Real-time advisories may also be provided to the aircrew for: when to start the APU; the first engine start time; the second engine start time (considering the engine should be fully powered when reaching the runway); and APU shutdown time. Further real-time evaluation and advisories are provided during the taxi-in phase of taxi procedure.

As previously stated, a real-time assessment of the aircraft systems, weather, airport and runway conditions should be performed before opting for RETO. For example, some conditions when RETO may be limited include: low visibility; icing; uphill or slippery taxiways; contaminated taxiways; unfamiliar or complex airports; heavy traffic on takeoff and landing; abnormal/emergency conditions; reduced braking functions; and engine related systems that are inoperative.

In addition to making an informed decision on application of RETO, the aircrew also needs to consider various factors to ensure that the operation is effective and yields the desired results. For example, the selection and of engine and APU operations should all be well coordinated. Some additional factors that are considered during RETO include: engine powering of the hydraulic system must be used to ensure steering and braking; and APU and bleed system must be operative during engine outage while taxiing.

Also, if an engine has been shut down for more than two hours, the non-running engine must be warmed up for a specified time period (per manufacturer's recommendations) before take-off to achieve thermal stability. On engines with a high bypass ratio, the warm-up time prior to applying takeoff thrust has a significant effect on engine life. One engine may be shut down when an "AFTER LANDING" checklist is completed but never less than a specified time period (per manufacturer's recommendations) after using reverse thrust above idle. On engines with a high bypass ratio, the cool-down time after reverse operations and prior to shut down have a significant effect on engine life. For twin-engine aircraft, slow and/or tight taxi turns in the direction of the operating engine may not be possible at high gross weight. However, slightly higher weights may also be acceptable for three or four engine aircraft types. In other embodiments, RETO analysis may be conducted for these three or four multi engine type of aircraft.

Some aircraft SOPs indicate that the APU should be started before shutting down the engine after landing to avoid an electrical transient. Hence if the aircraft is dispatched with Non-Functional APU, RETO is not permissible. If an aircrew decides to use one or two engines out during a taxi, then SOP recommendations about which engine(s) to use should be followed (e.g., taxi with a specified engine as per SOP due to hydraulics dependency). In summary, RETO is dependent on pneumatic, electrical and cross bleed requirements.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing real-time assessment and analysis for reduced engine taxi operations (RETO) for an aircraft, comprising:

retrieving, with a processor, time sensitive data that affects RETO for the aircraft;

retrieving, with a processor, non-time sensitive data that affects RETO for the aircraft;

retrieving, with a processor, ground operational data that affects RETO for an airport used by the aircraft;

collecting the time sensitive data, the non-time sensitive data and the ground operational data with an RETO analyzer which applies a predetermined RETO rules set to determine a recommendation of RETO for the aircraft;

transmitting the recommendation of RETO to a RETO support module;

retrieving historical flight data with the RETO support module to support RETO for the aircraft;

retrieving cost model data and financial model data with the RETO support module to support RETO for the aircraft;

generating RETO alerts, implementation plans and map overlays for the aircraft with the RETO support module; and displaying the RETO alerts, implementation plans and map overlays to an aircrew member of the aircraft.

2. The method of claim 1, where the RETO are for taxi in operations to an airport terminal.

3. The method of claim 1 where the RETO are for taxi out operations to an airport runway.

4. The method of claim 1, where the time sensitive data comprises real-time weather information.

5. The method of claim 1, where the time sensitive data comprises real-time traffic information.

6. The method of claim 1, where the time sensitive data comprises real-time maintenance information.

7. The method of claim 1, where the time sensitive data comprises real-time runway conditions.

8. The method of claim 1, where the non-time sensitive data comprises aircraft and engine performance information.

9. The method of claim 1, where the non-time sensitive data comprises flight log information for the aircraft.

10. The method of claim 1, where the ground operational data comprises layouts of taxiways for the aircraft.

11. The method of claim 1, where the cost model comprises aircraft maintenance costs.

12. The method of claim 1, where the cost model comprises aircraft fuel costs.

13. A system for providing real-time assessment and analysis for reduced engine taxi operations (RETO) for an aircraft, comprising:

a RETO analyzer that,
retrieves time sensitive data that affects RETO for the aircraft,
retrieves non-time sensitive data that affects RETO for the aircraft, retrieves ground operational data that affects RETO for an airport used by the aircraft,
analyzes the time sensitive data, the non-time sensitive data and the ground operational data by applying a predetermined RETO ruleset to determine a recommendation of RETO for the aircraft, and
transmits the recommendation of RETO to a RETO support module;

a RETO support module that receives the recommendation of RETO, where the RETO support module,
retrieves historical flight data to support RETO for the aircraft,
retrieves cost model data and financial model data to support RETO for the aircraft, and
generates RETO alerts, implementation plans and map overlays for the aircraft;
transmits the RETO alerts, implementation plans and map overlays for the aircraft; and a graphical display device on board the aircraft that receives the RETO alerts, implementation plans and map overlays for the aircraft from the RETO support module, where the graphical display device displays the RETO alerts, implementation plans and map overlays to aircrew of the aircraft.

14. The system of claim 13, where the graphical display device is a portable electronic device (PED).

15. The system of claim 14, where the PED is an electronic flight bag (EFB).

16. The system of claim 13, where the graphical display device includes a capability for the aircrew of the aircraft to override the recommendation of RETO.

17. The system of claim 13, where the RETO alerts are visual.

18. The system of claim 13, where the RETO alerts are aural.

* * * * *